US010078203B2

(12) United States Patent
Mori

(10) Patent No.: US 10,078,203 B2
(45) Date of Patent: Sep. 18, 2018

(54) LASER SCANNING MICROSCOPE APPARATUS AND LASER SCANNING METHOD HAVING LIGHT-LEVEL CONTROL AT FINER RESOLUTION THAN OUTPUT-POWER CONTROL

(71) Applicant: OLYMPUS CORPORATION, Shibuya-ku, Tokyo (JP)

(72) Inventor: Keigo Mori, Kanagawa (JP)

(73) Assignee: OLYMPUS CORPORATION, Tokyo (JP)

( * ) Notice: Subject to any disclaimer, the term of this patent is extended or adjusted under 35 U.S.C. 154(b) by 795 days.

(21) Appl. No.: 14/527,504

(22) Filed: Oct. 29, 2014

(65) Prior Publication Data

US 2015/0116822 A1 Apr. 30, 2015

(30) Foreign Application Priority Data

Oct. 30, 2013 (JP) .................. 2013-225636

(51) Int. Cl.
*G02B 21/00* (2006.01)
*G02B 21/06* (2006.01)
(Continued)

(52) U.S. Cl.
CPC ....... *G02B 21/002* (2013.01); *G02B 21/0032* (2013.01); *G02B 21/06* (2013.01); *G02B 21/16* (2013.01); *G02F 1/116* (2013.01)

(58) Field of Classification Search
CPC ............ G01N 21/645; G01N 21/6456; G01N 21/6458; G01N 2201/067; G02B 21/002;
(Continued)

(56) References Cited

U.S. PATENT DOCUMENTS 6,357,889 B1 * 3/2002 Duggal ................. F21V 3/0481
313/512
2002/0097487 A1 7/2002 Arai
(Continued)

FOREIGN PATENT DOCUMENTS

JP 2002131645 A 5/2002
JP 2007093988 A 4/2007
(Continued)

OTHER PUBLICATIONS

Japanese Office Action (and English translation thereof) dated Jun. 27, 2017, issued in counterpart Japanese Application No. 2013-225636.

*Primary Examiner* — Stephone B Allen
*Assistant Examiner* — Ryan S Dunning
(74) *Attorney, Agent, or Firm* — Holtz, Holtz & Volek PC

(57) ABSTRACT

Both light stimulation of a specimen at a high intensity and detailed fluorescence observation at a low intensity are realized by using a single laser light source. Provided is a laser scanning microscope apparatus (1) including a laser light source (11) that generates laser light; output-power control portion (13) that can set an output power of the laser light source (11) by changing the output power in a step-wise manner; an AOTF (15) that can adjust a light level of the laser light emitted from the laser light source (11) in a step-wise manner at a resolution that is finer than a resolution at which the output-power control portion (13) changes the output power of the laser light source (11); and an observation device (17) that scans the laser light whose light level has been adjusted by the AOTF (15) on a specimen and that detects fluorescence generated at the specimen.

15 Claims, 4 Drawing Sheets

(51) Int. Cl.
*G02B 21/16* (2006.01)
*G02F 1/11* (2006.01)

(58) Field of Classification Search
CPC ............... G02B 21/0032; G02B 21/0076; G02B 21/06; G02B 21/16; G02B 2207/113; G02B 21/0024; G02B 21/0028; G02F 1/11; G02F 1/113; G02F 1/116; G06T 2207/10064; G06T 2207/10121
USPC ..... 348/79, 80, 769; 356/904; 359/285, 286, 359/305, 308, 385–390; 362/259, 260; 378/43, 44; 250/201.3, 442.11
See application file for complete search history.

(56) References Cited

U.S. PATENT DOCUMENTS

| | | | |
|---|---|---|---|
| 2007/0081233 A1 | 4/2007 | Hattori | |
| 2007/0274634 A1* | 11/2007 | Yabe | G02B 21/16 385/37 |
| 2010/0290020 A1* | 11/2010 | Mori | G03F 7/70308 355/67 |
| 2013/0242595 A1* | 9/2013 | Jaffe | F21V 11/00 362/552 |

FOREIGN PATENT DOCUMENTS

| | | |
|---|---|---|
| JP | 2012118379 A | 6/2012 |
| JP | 2012212133 A | 11/2012 |

\* cited by examiner

LASER SCANNING MICROSCOPE APPARATUS AND LASER SCANNING METHOD HAVING LIGHT-LEVEL CONTROL AT FINER RESOLUTION THAN OUTPUT-POWER CONTROL

CROSS-REFERENCE TO RELATED APPLICATIONS

This application is based on Japanese Patent Application No. 2013-225636, the contents of which are incorporated herein by reference.

TECHNICAL FIELD

The present invention relates to a laser scanning microscope apparatus and a laser scanning method.

BACKGROUND ART

In the related art, there is a known laser microscope with which light stimulation and fluorescence observation a specimen are performed (for example, see Patent Literature 1). A relatively high light intensity is required in order to obtain a response when performing light stimulation of a specimen, whereas a relatively low light intensity is often demanded for fluorescence observation in order to avoid color fading.

A laser microscope disclosed in Patent Literature 1 is provided with an acousto-optic device like an AOTF (Acoust-Optic Tunable Filter), and the intensity of laser light is modulated by using the acousto-optic device when performing light stimulation and fluorescence observation a specimen.

CITATION LIST

Patent Literature

{PTL 1} Japanese Unexamined Patent Application, Publication No. 2002-131645

SUMMARY OF INVENTION

With the laser microscope in the related art, in the case in which both light stimulation and fluorescence observation a specimen are performed by using a single laser light source, fluorescence observation is also performed by using high-intensity laser light in accordance with the light intensity used for performing light stimulation. Thus, assuming that the setting resolution of the acousto-optic device is constant regardless of the laser-light intensity, the light level can only be adjusted in the same unit as in the case of performing light stimulation at a high intensity, even when performing fluorescence observation at a low intensity. Because of this, the laser-light intensity cannot be finely adjusted when attempting to perform fluorescence observation at a low intensity, which makes it difficult to observe a specimen in detail at a desired light intensity.

The present invention provides a laser scanning microscope apparatus and a laser scanning method that can realize both light stimulation of a specimen at a high intensity and detailed fluorescence observation thereof at a low intensity by using a single laser light source.

A first aspect of the present invention is a laser scanning microscope apparatus including a light source that generates laser light; an output-power control portion that can set an output power of the light source by changing the output power in a step-wise manner; a light-level control portion that can adjust a light level of the laser light emitted from the light source in a step-wise manner at a resolution that is finer than a resolution at which the output power of the light source is changed by the output-power control portion; and an observation portion that scans the laser light whose light level has been adjusted by the light-level control portion on a specimen, and that detects fluorescence generated in the specimen.

With this aspect, the laser light is emitted from the light source at an output power set by the output-power control portion, the light level of the laser light is adjusted by the light-level control portion, and the laser light is scanned on the specimen by the observation portion. Then, when fluorescence is generated at the specimen due to the irradiation with the laser light, this fluorescence is detected by the observation portion.

In this case, even if the setting resolution of the light-level control portion is constant regardless of the laser-light intensity, because the light level of the laser light is adjusted by the light-level control portion after the output power of the light source is changed by the output-power control portion between when performing fluorescence observation of a specimen and when performing light stimulation thereof, it is possible to use high-intensity laser light for light stimulation and, on the other hand, to use low-intensity laser light for fluorescence observation, and it is also possible to observe the specimen at a desired light intensity by finely adjusting the intensity of the low-intensity laser light during fluorescence observation.

In addition, due to the influence of heat, it takes time for the output power of the light source to stabilize when the output power is changed frequently; however, because the resolution at which the light level of the laser light is adjusted by the light-level control portion is finer than the resolution at which the output power of the light source is changed by the output-power control portion, by adjusting the light level of the laser light by means of the light-level control portion while keeping constant output powers for the light source set separately for fluorescence observation and light stimulation, it is possible to frequently perform fine adjustment of the light intensity of the laser light without being affected by heat.

Therefore, it is possible to realize both light stimulation of the specimen at a high intensity and detailed fluorescence observation thereof at a low intensity by using the single light source.

The above-described aspect may be provided with a correction portion that, in a case in which the output power of the light source is changed by the output-power control portion, corrects an angle of an optical axis of the laser light emitted from the light source.

When the output power of a light source is changed in a light source like a laser diode, the temperature in the area surrounding the chip of the light source changes, sometimes causing changes in the exit angle of laser light. With this configuration, the angle of the optical axis of the laser light is corrected by the correction portion even if the exit angle of laser light changes when the output power of the light source is changed, and thus, it is possible to prevent shifting of scanning positions at which the laser light is scanned by the observation portion and to prevent a failure to achieve the intended intensity for the laser light to be radiated onto the specimen.

The above-described aspect may be provided with an intensity display portion that displays an intensity of the laser light whose light level has been adjusted by the light-level control portion.

With this configuration, a user can easily ascertain, at a glance, the final intensity of the laser light that is set by the output-power control portion and adjusted by the light-level control portion.

The above-described aspect may be provided with a storage portion that stores an output power of the light source for performing fluorescence observation of the specimen and an output power of the light source for performing light stimulation of the specimen; and an output-power managing portion that manages the output-power control portion so that the output power stored in the storage portion is set to the light source when performing fluorescence observation or light stimulation.

With this configuration, each time fluorescence observation of the specimen or light stimulation thereof is performed, the output power of the light source can be switched by the output-power managing portion in accordance with the fluorescence observation or the light stimulation to be performed. Therefore, it is possible to eliminate the time and effort involved when the user switches the output powers for the light source.

In the above-described aspect, for each region that the observation portion scans with the laser light, the output-power control portion may change the output power of the light source to an output power set in advance, and the light-level adjusting portion may adjust the laser light to a light level set in advance.

With this configuration, in the case in which there are multiple observation areas in a specimen, it is possible to perform fluorescence observation or light stimulation at each observation area by automatically using a desired light intensity.

A second aspect of the present invention is a laser scanning microscope apparatus including a light source that generates laser light; an output-power controller which sets an output power of the light source by changing the output power in a step-wise manner; an acoust-optic device which adjusts a light level of the laser light emitted from the light source in a step-wise manner at a resolution that is finer than a resolution at which the output power of the light source is changed by the output-power controller; and an observation device including (i) a scanner which scans the laser light whose light level has been adjusted by the acoust-optic device on a specimen, and (ii) a detector which detects fluorescence generated in the specimen.

The above-described aspect may be provided with a light deflection device that, in a case in which the output power of the light source is changed by the output-power controller, corrects an angle of an optical axis of the laser light emitted from the light source.

The above-described aspect may be provided with a display that displays an intensity of the laser light whose light level has been adjusted by the acoust-optic device.

The above-described aspect may be provided with a memory that stores an output power of the light source for performing fluorescence observation of the specimen and an output power of the light source for performing light stimulation of the specimen; and wherein the output-power controller sets the output power stored in the memory to the light source when performing fluorescence observation or light stimulation.

In the above-described aspect, for each region that the scanner of the observation device scans with the laser light, the output-power controller may change the output power of the light source to an output power set in advance, and the acoust-optic device may adjust the laser light to a light level set in advance.

A third aspect of the present invention is a laser scanning method for a laser scanning microscope apparatus which comprises a light source that generates laser light, the method including setting an output power of the light source by changing the output power in a step-wise manner; adjusting a light level of the laser light emitted from the light source in a step-wise manner at a resolution that is finer than a resolution at which the output power of the light source is changed; and scanning the laser light whose light level has been adjusted on a specimen, and detecting fluorescence generated in the specimen.

The above-described aspect may be provided with, in a case in which the output power of the light source is changed, correcting an angle of an optical axis of the laser light emitted from the light source.

The above-described aspect may be provided with displaying an intensity of the laser light whose light level has been adjusted.

The above-described aspect may be provided with storing an output power of the light source for performing fluorescence observation of the specimen and an output power of the light source for performing light stimulation of the specimen; and managing the output power of the light source so that the output power stored in the memory is set to the light source when performing fluorescence observation or light stimulation.

In the above-described aspect, for each region that is scanned with the laser light, the output power of the light source may be changed to an output power set in advance, and the light level of the laser light may be adjusted to a light level set in advance.

The present invention affords an advantage in that it is possible to realize both light stimulation of a specimen at a high intensity and detailed fluorescence observation thereof at a low intensity by using a single laser light source.

DESCRIPTION OF EMBODIMENT

A laser scanning microscope apparatus and a laser scanning method according to an embodiment of the present invention will be described below with reference to the drawings.

Figure 1:
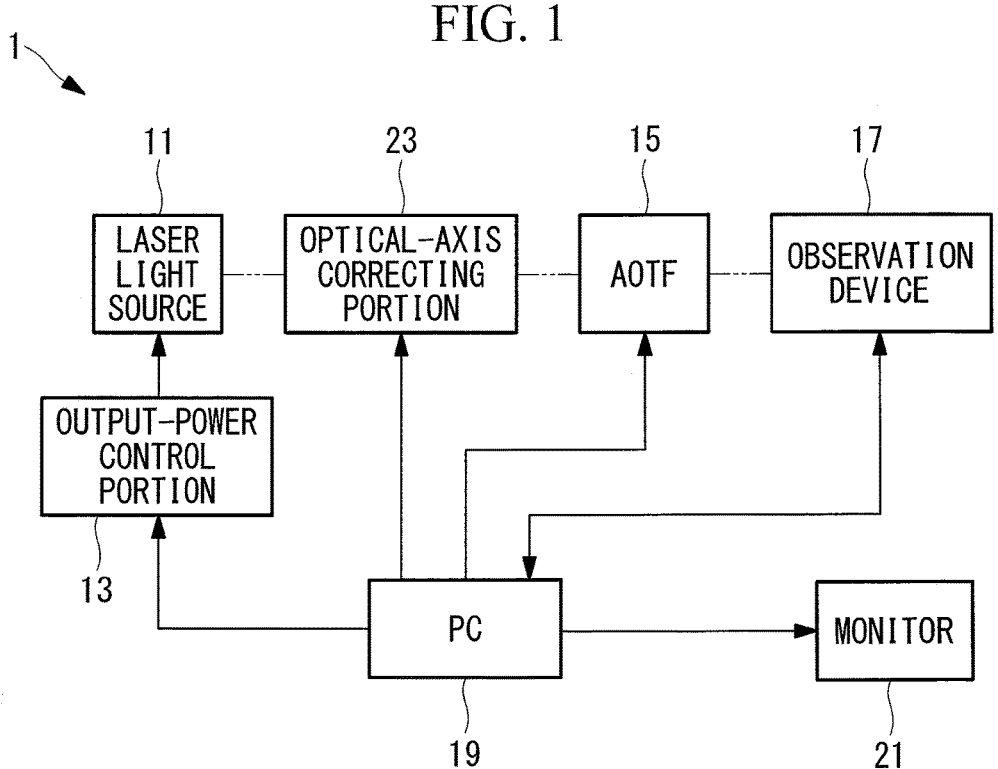
FIG. 1 is a diagram showing, in outline, the configuration of a laser scanning microscope apparatus according to an embodiment of the present invention.

As shown in FIG. 1, a laser scanning microscope apparatus 1 according to this embodiment is provided with a laser light source (light source) 11 that generates laser light; an output-power control portion 13 that sets the output power of the laser light source 11 by changing it in a step-wise manner; an AOTF (Acoust-Optic Tunable Filter, light-level control portion, acoust-optic device) 15 that adjusts the light level of the laser light emitted from the laser light source 11 in a step-wise manner; an observation device (observation portion) 17 that acquires image information of a specimen by irradiating a specimen (not shown) with the laser light whose light level has been adjusted by the AOTF 15; a PC (Personal Computer) 19 having control software for controlling the output-power control portion 13, the AOTF 15, the observation device 17, and so forth; and a monitor 21 that displays control information from the PC 19, the image information acquired by the observation device 17, and so forth. In addition, the laser scanning microscope apparatus 1 is provided with an optical-axis correcting portion (correction portion) 23 that can correct the angle of the optical axis of the laser light emitted from the laser light source 11.

The laser light source 11 is, for example, a laser diode. This laser light source 11 is configured so that the output power thereof can be switched between two levels, for example, HIGH and LOW, in accordance with instructions from the PC 19. In addition, the laser light source 11 is configured so as to generate the laser light at 100% output power when set to HIGH and to generate the laser light at 10% output power when set to LOW.

The output-power control portion 13 sets the output power of the laser light source 11 to HIGH or LOW according to instructions from the PC 19. The output power control portion 13 may be, for example, a control board which controls output of the laser light source 11 by adjusting a driving current based on an order from the PC 19.

The AOTF 15 is constituted of, for example, an acousto-optic device. This AOTF 15 is configured so that, in accordance with instructions from the PC 19, the light level of the laser light can be adjusted at a finer resolution than the resolution at which the output power of the laser light source 11 is changed by the output-power control portion 13. For example, the AOTF 15 outputs the incident laser light by adjusting the light level thereof with a precision of 0.1% within a range from 0 to 100%.

The observation device 17 is provided with a scanner (not shown) that deflects the laser light from the AOTF 15 and scans it two dimensionally over the specimen and a detector (not shown), like a PMT (Photomultiplier Tube), that detects fluorescence generated at the specimen due to irradiation with the laser light and that outputs a luminance signal corresponding to the luminance of the detected fluorescence.

The optical-axis correcting portion 23 is disposed in the optical path of the laser light between the laser light source 11 and the AOTF 15. In addition, the optical-axis correcting portion 23 is constituted of, for example, two planar mirrors (not shown) and motors (not shown) that drive these planar mirrors in accordance with instructions from the PC 19.

This optical-axis correcting portion 23 is configured so that the optical axis of the laser light can be horizontally moved (shifted) by moving the planar mirrors along the X- and Y-axes at the same time by means of the motors. In addition, the optical-axis correcting portion 23 is configured so that the inclination (tilting) of the optical axis of the laser light can be adjusted by pivoting the planar mirrors about shafts that are perpendicular to each other by means of the motors.

The PC 19 is configured so as to, in accordance with instructions from a user, set the output power of the laser light source 11 in the output-power control portion 13 and to set a light level of the laser light to be adjusted in the AOTF 15. In addition, the PC 19 is configured so as to, in accordance with instructions from the user, give instructions to the observation device 17 for starting fluorescence observation or starting light stimulation, and to activate the scanner and the detector. In addition, the PC 19 is configured so as to generate an image of the specimen based on the luminance signals acquired by the detector of the observation device 17 and to display it on the monitor 21.

Furthermore, the PC 19 has an LUT (Look-Up Table) in which the output powers of the laser light source 11 are associated with positions and angles of the planar mirrors of the optical-axis correcting portion 23 so as to correct angular displacements of the optical axis of the laser light in accordance with the output power of the laser light source 11. When the output power of the laser light source 11 is changed by the output-power control portion 13, the PC 19 adjusts the planar mirrors by driving the motors of the optical-axis correcting portion 23 in accordance with the LUT.

The operation of the thus-configured laser scanning microscope apparatus 1 will now be described.

When performing fluorescence observation of a specimen with low-intensity laser light by using the laser scanning microscope apparatus 1 according to this embodiment, first, a user inputs the output power of the laser light source 11 and the output power of the AOTF 15 via the control software in the PC 19.

When LOW is input as the output power for the laser light source 11, the PC 19 sets the output power of the laser light source 11 to 10% in the output-power control portion 13. Then, the PC 19 causes the motors of the optical-axis correcting portion 23 to be driven in accordance with the LUT so as to be compatible with the set output power of the laser light source 11, and thus, the positions and angles of the planar mirrors are adjusted.

When the output power of the laser light source 11 is changed, the temperature in the area surrounding the chip of the laser light source 11 changes, sometimes causing changes in the exit angle of the laser light. In this embodiment, an angular displacement of the optical axis of the laser light is corrected by the optical-axis correcting portion 23 even if the exit angle of the laser light is changed when the output power of the laser light source 11 is changed, and thus, it is possible to prevent displacement of the scanning range in which the laser light is scanned by the observation device 17.

When, for example, 5.5% is input as the output power for the AOTF 15, the PC 19 sets the output power of the laser light to 5.5% in the AOTF 15.

Figure 2:
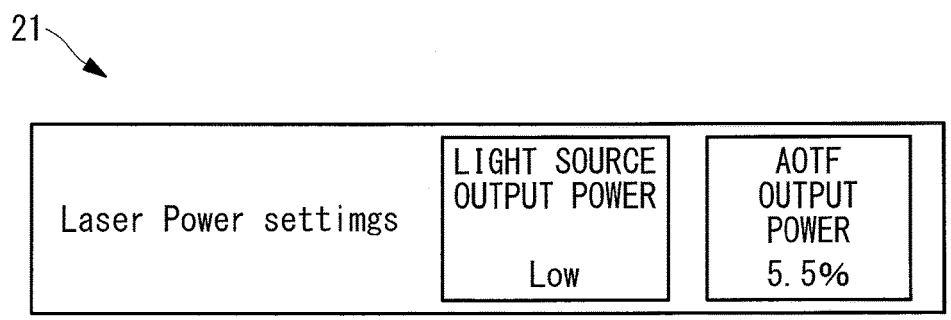
FIG. 2 is a diagram showing an example display of output-power settings for the laser light source and AOTF in FIG. 1.

As shown in FIG. 2, the PC 19 displays the output power input for the laser light source 11 and the output power input for the AOTF 15 on the monitor 21.

Subsequently, when the user gives an instruction for starting fluorescence observation via the control software in the PC 19, the scanner and the detector of the observation device 17 are activated by the PC 19. Then, laser light is emitted from the laser light source 11 at 10% output power due to the output-power control portion 13, and the laser light is made to enter the AOTF 15 after being tilted and shifted by the optical-axis correcting portion 23.

The laser light that has entered the AOTF 15 is output therefrom after the light level thereof is adjusted to 5.5% and is made to enter the observation device 17. Specifically, the laser light whose light level is adjusted to, overall, 0.1×0.055×100=0.55(%) by the output-power control portion 13 and the AOTF 15 is made to enter the observation device 17.

The laser light that has entered the observation device 17 is deflected by the scanner and is two dimensionally scanned over the specimen. Then, fluorescence generated at the specimen due to the irradiation with the laser light is detected by the detector via the scanner, and luminance signals corresponding to the luminances of the detected fluorescence are transmitted to the PC 19.

Using the PC 19, an image of the specimen is generated based on the luminance signals transmitted from the observation device 17 and is displayed on the monitor 21. The user adjusts the output power of the AOTF 15 via the control software in the PC 19 while viewing the image of the specimen displayed on the monitor.

Because the light level of the laser light whose output power has been suppressed to 10% by the laser light source 11 is further adjusted by the AOTF 15, it is possible to more finely adjust the light level of the laser light as compared with the case in which the light level of the laser light is adjusted by the AOTF 15 alone. By doing so, the user can observe the specimen at a desired light intensity in the image displayed on the monitor.

Next, when performing light stimulation of the specimen with high-intensity laser light, as with the case of fluorescence observation, the user inputs the output power for the laser light source 11 and the output power for the AOTF 15 via the control software in the PC 19.

When HIGH is input as the output power for the laser light source 11, the PC 19 sets the output power of the laser light source 11 to 100% in the output-power control portion 13. Then, the PC 19 causes the motors of the optical-axis correcting portion 23 to be driven in accordance with the LUT so as to be compatible with the set output power of the laser light source 11, and thus, the positions and angles of the planar mirrors are adjusted.

In addition, for example, when 80.0% is input as the output power for the AOTF 15, the PC 19 sets the output power of the laser light to 80.0% in the AOTF 15.

Subsequently, when the user gives an instruction for starting light stimulation via the control software in the PC 19, the scanner of the observation device 17 is activated by the PC 19. Then, laser light is emitted from the laser light source 11 at 100% output power due to the output-power control portion 13, and the laser light is made to enter the AOTF 15 after being tilted and shifted by the optical-axis correcting portion 23.

The laser light that has entered the AOTF 15 is output therefrom after the light level thereof is adjusted to 80.0% and is made to enter the observation device 17. Specifically, the laser light whose light level is adjusted to, overall, 1×0.8×100=80.0(%) by the output-power control portion 13 and the AOTF 15 is made to enter the observation device 17.

The laser light that has entered the observation device 17 is deflected by the scanner and is two dimensionally scanned over the specimen. By doing so, the specimen is subjected to light stimulation at the position irradiated with the laser light.

By setting a desired observation position while viewing the image of the specimen by means of fluorescence observation and by switching between light stimulation and fluorescence observation, the user can subject that observation position to light stimulation by performing light stimulation thereof and can observe a response at that observation position by performing fluorescence observation.

As has been described above, with the laser scanning microscope apparatus 1 according to this embodiment, the light level of the laser light is adjusted by the AOTF 15 after the output power of the laser light source 11 is changed by the output-power control portion 13 between when performing fluorescence observation of the specimen and when performing light stimulation thereof. By doing so, it is possible to use high-intensity laser light for light stimulation and, on the other hand, to use low-intensity laser light for fluorescence observation, and it is also possible to observe the specimen at a desired light intensity by finely adjusting the intensity of the low-intensity laser light during fluorescence observation. In addition, by setting the output power of the laser light source 11 low during fluorescence observation of the specimen, it is possible to improve the lifespan of the laser light source 11.

In addition, due to the influence of heat, it takes time for the output power of the laser light source 11 to stabilize when the output power is changed frequently; however, because the resolution at which the light level of the laser light is adjusted by the AOTF 15 is finer than the resolution at which the output power of the light source is changed by the output-power control portion 13, by adjusting the light level of the laser light by means of the AOTF 15 while keeping constant output powers for the laser light source 11 set separately for fluorescence observation and light stimulation, it is possible to frequently perform fine adjustment of the light intensity of the laser light without being affected by heat.

Therefore, it is possible to realize both light stimulation of the specimen at a high intensity and detailed fluorescence observation thereof at a low intensity by using the single laser light source 11.

In this embodiment, although a displacement of the optical axis of the laser light is corrected by the optical-axis correcting portion 23 each time the output power of the laser light source 11 is changed by the output-power control portion 13, the correction need not be performed when the displacement of the optical axis is within an allowable range, or, alternatively, the optical-axis correcting portion 23 need not be provided.

This embodiment can be modified as described below.

Figure 3:
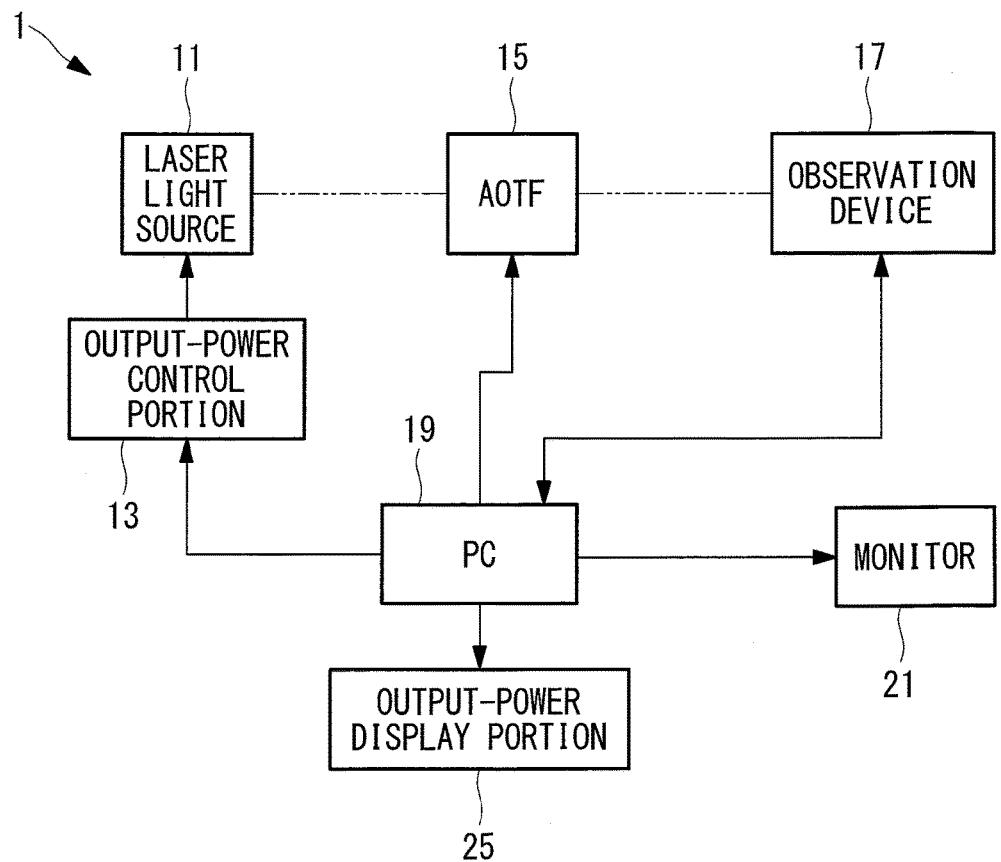
FIG. 3 is a diagram showing, in outline, the configuration of a laser scanning microscope apparatus according to a first modification of the embodiment of the present invention.

As a first modification, for example, as shown in FIG. 3, an output-power display portion (intensity display portion) 25 (a monitor or a display screen) that displays the intensity of the laser light after light-level adjustment by the AOTF 15, that is, the intensity of the laser light obtained by adding together light-level adjustments by the output-power control portion 13 and the AOTF 15, may be provided.

Figure 4:
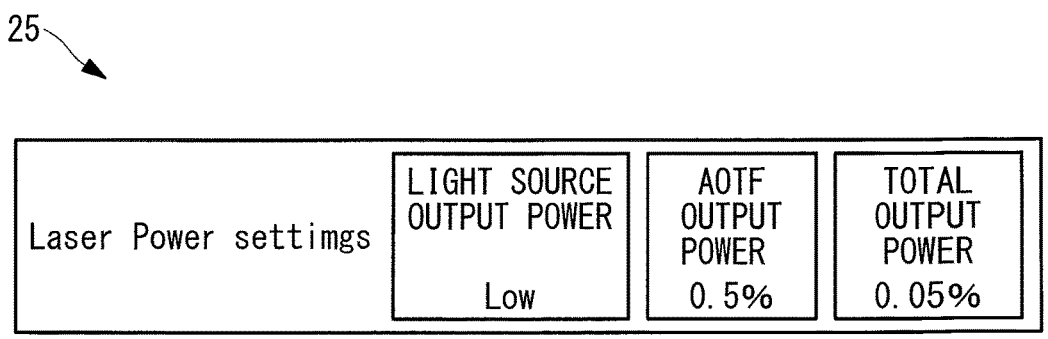
FIG. 4 is a diagram showing an example display of output-power settings for the laser light source and AOTF in FIG. 3.

With this modification, for example, in the case in which fluorescence observation of the specimen is performed by using low-intensity laser light, when the PC 19 sets the output power for the laser light source 11 to 10% (LOW) in the output-power control portion 13 and when the PC 19 sets the output power for the AOTF 15 to, for example, 0.5%, the PC 19 computes 0.1×0.005×100=0.05%. By doing so, as shown in FIG. 4, 0.05% is displayed on the output-power display portion 25 as an output power obtained by adding together light-level adjustments by the output-power control portion 13 and the AOTF 15, that is, the total output power.

By doing so, the user can easily ascertain, just by viewing the output-power display portion 25, the final intensity of the laser light that is set by the output-power control portion 13 and adjusted by the AOTF 15. Although the output-power display portion 25 is provided in this modification, alternatively, the monitor 21 may have a function as an output-power display portion, and the intensity of the laser light obtained by adding together the light levels adjusted by the output-power control portion 13 and the AOTF 15 may be displayed on the monitor 21.

Although the user directly sets the output power of the output-power control portion 13 in this embodiment, alternatively, for example, the user may set the final light level of the laser light, and the PC 19 may set the output power of the output-power control portion 13 and the output power of the AOTF 15. For example, when the user sets the final light level of the laser light to 0.05%, the PC 19 may distribute this value so that the output power of the laser light source 11 would be 10% and the output power of the AOTF 15 would be 0.5%.

Figure 5:
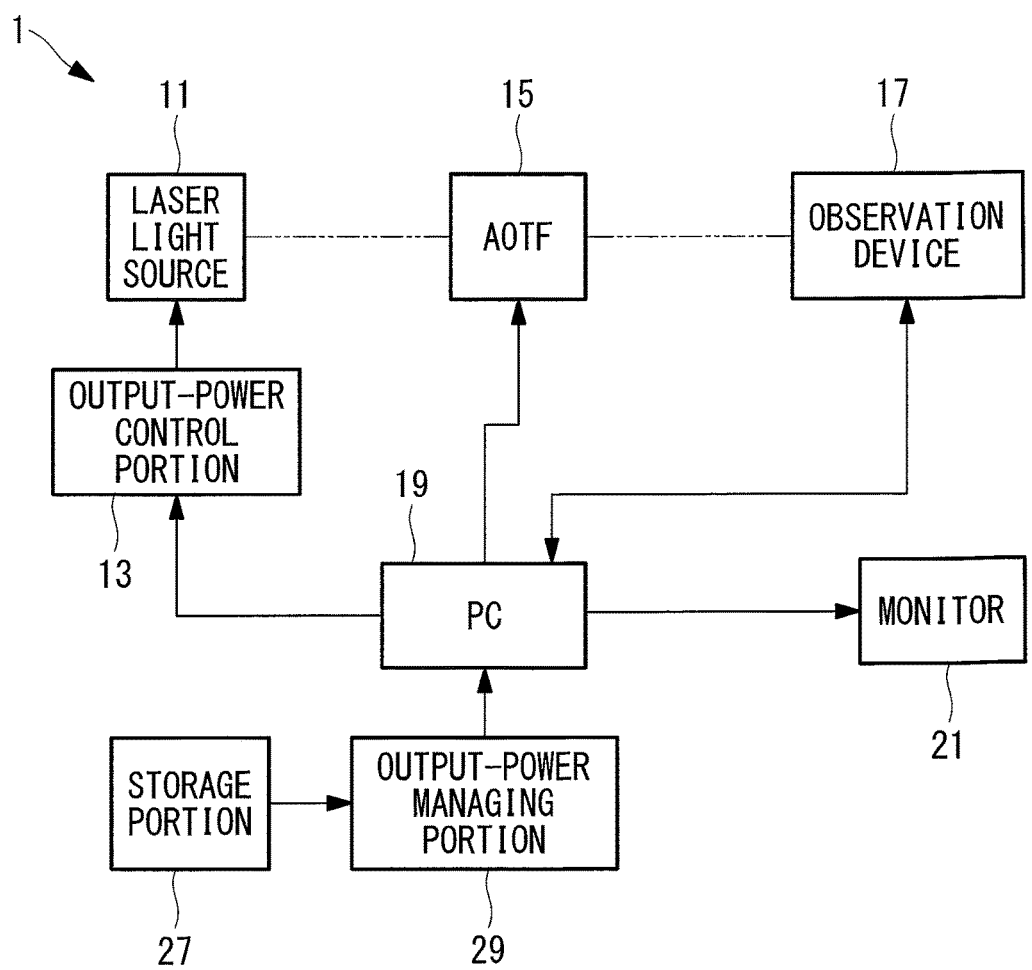
FIG. 5 is a diagram showing, in outline, the configuration of a laser scanning microscope apparatus according to a second modification of the embodiment of the present invention.

As a second modification, for example, as shown in FIG. 5, a storage portion 27 that stores output powers for the laser light source 11 separately for when performing fluorescence observation of the specimen and when performing light stimulation thereof and an output-power managing portion 29 that manages the output-power control portion 13 so that the output powers stored in the storage portion 27 are set in the laser light source 11 when performing fluorescence observation and light stimulation may be provided. The storage portion 27 may be a memory which is readable by the pc 19, or a portion in a memory in the PC 19. The output-power managing portion 29 may be, for example, a software module which is carried out by the PC 19.

In this modification, the storage portion 27 stores, for example, LOW as the output power for the laser light source 11 when performing fluorescence observation of the specimen and HIGH as the output power for the laser light source 11 when performing light stimulation of the specimen. In addition, the user should set the output power for the AOTF 15 via a fluorescence-observation setting UI (User Interface) of the control software in the PC 19 when performing fluorescence observation and may set the output power for the AOTF 15 via a stimulation setting UI of the control software in the PC 19 when performing light stimulation. In addition, the set output power of the AOTF 15 for performing fluorescence observation and the set output power of the AOTF 15 for performing light stimulation should be displayed on the monitor 21 by means of the PC 19.

Figure 6:
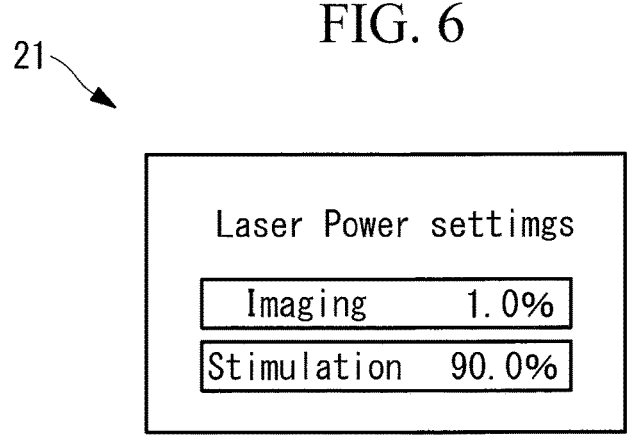
FIG. 6 is a diagram showing an example display of output-power settings for the laser light source and AOTF in FIG. 5.

In this modification, in the case in which fluorescence observation is performed with the low-intensity laser light after performing light stimulation of the specimen with the high-intensity laser light, first, the user inputs, for example, 1.0% as the output power for the AOTF 15 via the fluorescence-observation setting UI of the control software in the PC 19 and inputs, for example, 90.0% as the output power for the AOTF 15 via the stimulation setting UI. The input output powers for the AOTF 15 when performing fluorescence observation (Imaging) and when performing light stimulation (Stimulation) are displayed on the monitor 21 by means of the PC 19, as shown in FIG. 6.

When the user gives an instruction for starting light stimulation via the control software in the PC 19, the PC 19 sets the output power for the laser light source 11 to 100% in the output-power control portion 13 in accordance with the output power (HIGH) for the laser light source 11 for performing light stimulation read out from the storage portion 27 by the output-power managing portion 29. In addition, by means of the PC 19, the output power of the laser light is set to 90% in the AOTF 15 in accordance with the instruction from the user, and the scanner of the observation device 17 is activated.

Then, the laser light is emitted from the laser light source 11 at 100% output power due to the output-power control portion 13, the laser light is tilted and shifted by the optical-axis correcting portion 23, and, subsequently, the laser light is output with the light level thereof adjusted to 90% by the AOTF 15. By doing so, the laser light whose light level is adjusted to, overall, 1.0×0.90×100=90(%) is radiated onto the specimen by the observation device 17, and thus, light stimulation of the specimen is performed.

When the light stimulation of the specimen is completed, the user gives an instruction for starting fluorescence observation via the control software.

The PC 19 sets the output power for the laser light source 11 to 10% in the output-power control portion 13 in accordance with the output power (LOW) for the laser light source 11 for performing fluorescence observation read out from the storage portion 27 by the output-power managing portion 29. In addition, by means of the PC 19, the output power value for the AOTF 15 is set to 1.0% in accordance with the instruction from the user, and the scanner and the detector of the observation device 17 are activated.

Then, the laser light is caused to be emitted from the laser light source 11 at 10% output power by the output-power control portion 13, the laser light is tilted and shifted by the optical-axis correcting portion 23, and, subsequently, the laser light is output with the light level thereof adjusted to 1.0% by the AOTF 15. By doing so, the laser light whose light level is adjusted to, overall, 0.1×0.01×100=0.1(%) is radiated onto the specimen by the observation device 17. Then, fluorescence from the specimen is detected and an image of the specimen is generated.

By doing so, it is possible to observe the response at the specimen caused by the light stimulation on the monitor 21.

With this modification, it is possible to switch between output powers for the laser light source 11 each time fluorescence observation of the specimen or light stimulation thereof is performed by means of the output-power managing portion 29 in accordance with fluorescence observation or light stimulation to be performed, and thus, it is possible to eliminate the time and effort involved when the user switches the output powers for the laser light source 11.

As a third modification, a storage portion (not shown) that stores the output power for the laser light source 11 and the output power for the AOTF 15 that are set by the PC 19 in advance for each of regions scanned with the laser light by the observation device 17 may be included. In addition, for each scanning region, the PC 19 may control the output-power control portion 13 and the AOTF 15 in accordance with the information stored in the storage portion.

In this case, the user should input the output power for the laser light source 11 and the output power for the AOTF 15 via the control software in the PC 19, and the user should also store the input information in the storage portion by specifying regions to be scanned with the laser light.

In addition, the PC 19 should read out the respective output powers stored in the storage portion for each scanning region, should set the readout output powers in the output-power control portion 13 and the AOTF 15, respectively, should change the output power of the laser light to be generated by the laser light source 11 by means of the output-power control portion 13, and also should change the light level of the laser light to be output from the AOTF 15.

Figure 7:
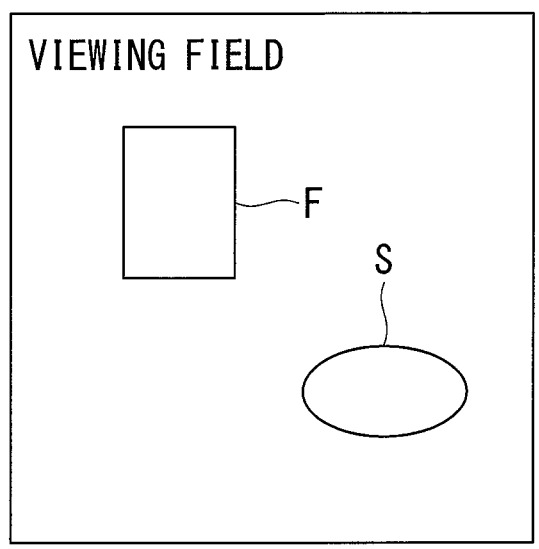
FIG. 7 is a diagram showing an example region on a specimen that is scanned with laser light by a laser scanning microscope apparatus according to a third modification of the embodiment of the present invention.

In this modification, in the case in which light stimulation of the specimen is performed by changing the intensity of the laser light at each scanning region, for example, the user inputs HIGH as the output power for the laser light source 11 and also inputs 100% as the output power for the AOTF 15. Then, as shown in FIG. 7, a first scanning region F is specified as a region to be scanned with the laser light and is stored in the storage portion along with the output-power information that is input. Similarly, for example, the user inputs LOW as the output power for the laser light source 11 and also inputs 1.5% as the output power for the AOTF 15, and, as shown in FIG. 7, a second scanning region S is specified as the other region to be scanned with the laser light and is stored in the storage portion along with the input output-power information.

When the user gives an instruction for starting light stimulation at the scanning regions F and S via the control software in the PC 19, first, to scan the first scanning region F, output powers for the output-power control portion 13 and the AOTF 15, which are stored in the storage portion, are individually read out by the PC 19. Then, the PC 19 sets the output power for the laser light source 11 to 100% (HIGH) in the output-power control portion 13 and also sets the output power for the laser light to 100% in the AOTF 15, and the scanner of the observation device 17 is activated.

Subsequently, laser light is emitted from the laser light source 11 at 100% output power due to the output-power control portion 13, the laser light is tilted and shifted by the optical-axis correcting portion 23, and, subsequently, the laser light is output from the AOTF 15 at 100% light level. By doing so, the laser light whose overall light level is $1.0 \times 1.0 \times 100 = 100.0(\%)$ is radiated onto the specimen by the observation device 17, and thus, light stimulation of the specimen is performed.

Next, when the process moves on to scan the second scanning region S, the output powers for the output-power control portion 13 and the AOTF 15 stored in the storage portion are individually read out by the PC 19. Then, the PC 19 sets the output power for the laser light source 11 to 10% (LOW) in the output-power control portion 13 and also sets the output power for the laser light to 1.5% in the AOTF 15.

Subsequently, laser light is emitted from the laser light source 11 at 10% output power due to the output-power control portion 13, the laser light is tilted and shifted by the optical-axis correcting portion 23, and, subsequently, the laser light is output with the light level thereof adjusted to 1.5% by the AOTF 15. By doing so, the laser light whose light level is adjusted to, overall, $0.1 \times 0.015 \times 100 = 0.15(\%)$ is radiated onto the specimen by the observation device 17, and thus, light stimulation of the specimen is performed.

With this modification, in the case in which there are a plurality of observation areas in a specimen, fluorescence observation and light stimulation can be performed automatically at a desired light intensity at each observation area just by having the user store, in the PC 19 in advance, desired output powers for the output-power control portion 13 and the AOTF 15 for each scanning region.

Although this modification has been described by using the scanning regions F and S as examples, the operation is the same in the case in which there are three or more scanning regions.

As above, although an embodiment of the present invention has been described in detail with reference to the drawings, specific configurations are not limited to this embodiment, and design alterations or the like within a range that does not depart from the scope of the present invention are also encompassed. For example, the present invention is not limited to application to the above-described embodiment and modifications thereof; and the present invention may be applied to forms in which the embodiment and the modifications thereof are appropriately combined, without being particularly limited.

In addition, in the above-described embodiment, the output power of the laser light source 11 is switched between two levels, that is, HIGH and LOW, and the output power of the AOTF 15 is adjusted with a precision of 0.1% within a range from 0 to 100%; however, it suffices to allow the AOTF 15 to adjust the light level of the laser light at a finer resolution than the resolution at which the output power of the laser light source 11 is changed by the output-power control portion 13. The resolutions at which the output powers of the laser light source 11 and the AOTF 15 can be changed are not limited thereto.

If the setting resolution of the AOTF 15 (acousto-optic device) is set at a finer level than 0.1% (for example, at a precision of 0.01% or the like), it is necessary to employ a DA converter having a high bit number that is compatible with the setting resolution, which makes the apparatus expensive. In addition, in order to correct the linearity of output power with respect to the input of the AOTF 15, it is necessary to have an LUT in which instruction signals for desired intensities of the laser light are associated with input signals; however, a finer setting resolution results in an enormous amount of data in the LUT, thus sometimes requiring very large amounts of time and effort to set up the LUT. Furthermore, if the setting resolution is made small, like 0.01%, gain and offset values of an electrical circuit system drift due to a minute temperature changes, which sometimes makes it difficult to constantly perform accurate control in which linearity is maintained. Therefore, it is more preferable that the setting resolution of the AOTF 15 be kept at about 0.1% or greater.

Furthermore, in the above-described embodiments and modifications thereof, a description has been given of a case in which the AOTF 15 is used as a light-level control portion and an acoust-optic device. Instead of this, for example, an AOM (Acoust Optic Modulator) may be adopted.

REFERENCE SIGNS LIST

1 laser scanning microscope apparatus
11 laser light source (light source)
13 output-power control portion
15 AOTF (light-level control portion, acoust-optic device)
17 observation device (observation portion)
23 optical-axis correcting portion (correction portion)
25 output-power display portion (intensity display portion)
27 storage portion
29 output-power managing portion

The invention claimed is:

1. A laser scanning microscope apparatus comprising:
a light source that generates laser light;
an output-power control portion that can set an output power of the light source by changing the output power in a step-wise manner;
a light-level control portion that can adjust a light level of the laser light emitted from the light source in a step-wise manner at a resolution that is finer than a resolution at which the output power of the light source is changed by the output-power control portion; and
an observation portion that scans the laser light whose light level has been adjusted by the light-level control portion on a specimen, and that detects fluorescence generated in the specimen;
wherein the output-power control portion is operable to select the output power of the light source from among at least a first output power and a second output power which are different from each other, and wherein the light source emits light that is received by the light-level control portion at both the first output power and the second output power; and wherein the output-power control portion sets the output power of the light source by adjusting a driving current of the light source.

2. The laser scanning microscope apparatus according to claim 1, further comprising:
a correction portion that, in a case in which the output power of the light source is changed by the output-power control portion, corrects an angle of an optical axis of the laser light emitted from the light source.

3. The laser scanning microscope apparatus according to claim 1, further comprising:
an intensity display portion that displays an intensity of the laser light whose light level has been adjusted by the light-level control portion.

4. The laser scanning microscope apparatus according to claim 1, further comprising:
a storage portion that stores an output power of the light source for performing fluorescence observation of the specimen and an output power of the light source for performing light stimulation of the specimen; and
an output-power managing portion that manages the output-power control portion so that the output power of the light source is set to a corresponding output power stored in the storage portion when fluorescence observation or light stimulation is performed.

5. The laser scanning microscope apparatus according to claim 1, wherein, for each region that the observation portion scans with the laser light, the output-power control portion changes the output power of the light source to an output power set in advance, and the light-level adjusting portion adjusts the laser light to a light level set in advance.

6. A laser scanning microscope apparatus comprising:
a light source that generates laser light;
an output-power controller which sets an output power of the light source by changing the output power in a step-wise manner;
an acousto-optic device which adjusts a light level of the laser light emitted from the light source in a step-wise manner at a resolution that is finer than a resolution at which the output power of the light source is changed by the output-power controller; and
an observation device including (i) a scanner which scans the laser light whose light level has been adjusted by the acousto-optic device on a specimen, and (ii) a detector which detects fluorescence generated in the specimen;
wherein the output-power controller is operable to select the output power of the light source from among at least a first output power and a second output power which are different from each other, and wherein the light source emits light that is received by the acousto-optic device at both the first output power and the second output power; and
wherein the output-power controller sets the output power of the light source by adjusting a driving current of the light source.

7. The laser scanning microscope apparatus according to claim 6, further comprising:
a light deflection device that, in a case in which the output power of the light source is changed by the output-power controller, corrects an angle of an optical axis of the laser light emitted from the light source.

8. The laser scanning microscope apparatus according to claim 6, further comprising:
a display that displays an intensity of the laser light whose light level has been adjusted by the acousto-optic device.

9. The laser scanning microscope apparatus according to claim 6, further comprising:
a memory that stores an output power of the light source for performing fluorescence observation of the specimen and an output power of the light source for performing light stimulation of the specimen; and
wherein the output-power controller sets the output power of the light source to a corresponding output power stored in the memory when fluorescence observation or light stimulation is performed.

10. The laser scanning microscope apparatus according to claim 6, wherein, for each region that the scanner of the observation device scans with the laser light, the output-power controller changes the output power of the light source to an output power set in advance, and the acousto-optic device adjusts the laser light to a light level set in advance.

11. A laser scanning method for a laser scanning microscope apparatus which comprises a light source that generates laser light, the method comprising:
setting an output power of the light source by changing the output power in a step-wise manner;
adjusting a light level of the laser light emitted from the light source in a step-wise manner at a resolution that is finer than a resolution at which the output power of the light source is changed; and
scanning the laser light whose light level has been adjusted on a specimen, and detecting fluorescence generated in the specimen;
wherein the setting the output power comprises selecting the output power of the light source from among at least a first output power and a second output power which are different from each other, wherein at both the first output power and the second output power the light source emits light to a position at which the adjusting is performed; and
wherein the setting the output power comprises adjusting a driving current of the light source.

12. The method according to claim 11, further comprising:
in a case in which the output power of the light source is changed, correcting an angle of an optical axis of the laser light emitted from the light source.

13. The method according to claim 11, further comprising:
displaying an intensity of the laser light whose light level has been adjusted.

14. The method according to claim 11, further comprising:
storing an output power of the light source for performing fluorescence observation of the specimen and an output power of the light source for performing light stimulation of the specimen; and
managing the output power of the light source so that the output power of the light source is set to a corresponding output power stored in the memory when fluorescence observation or light stimulation is performed.

15. The method according to claim 11, wherein, for each region that is scanned with the laser light, the output power of the light source is changed to an output power set in advance, and the light level of the laser light is adjusted to a light level set in advance.

* * * * *